United States Patent Office 3,457,036
Patented July 22, 1969

3,457,036
VACUUM CONCENTRATION OF PHOSPHORIC ACID
Peter Stanley Backlund, Anaheim, Calif., assignor to Union Oil Company of California, Los Angeles, Calif., a corporation of California
No Drawing. Continuation-in-part of application Ser. No. 269,889, Apr. 2, 1963. This application Oct. 13, 1967, Ser. No. 675,040
Int. Cl. C01b 25/18
U.S. Cl. 23—165          4 Claims

ABSTRACT OF THE DISCLOSURE

The invention comprises the preparation of a substantially anhydrous wet-process phosphoric acid having a $P_2O_5$ content from 67 to 76 weight percent on a bulk basis. The method uses submerged combustion evaporative heating at atmospheric pressure of a dilute wet-process phosphoric acid to concentrate the acid to an intermediate level of about 62 to 67 weight percent $P_2O_5$ and then subjecting the heated and partially concentrated acid to subatmospheric pressure to effect a finished vacuum concentration and attain the desired high $P_2O_5$ content.

---

Description of the invention

This is a continuation-in-part of copending application Ser. No. 269,889, filed Apr. 2, 1963.

This invention relates to a substantially anhydrous liquid phosphoric acid and, in particular, relates to the production of such an acid by combined atmospheric pressure vacuum concentration.

A substantially anhydrous liquid phosphoric acid prepared from wet-process phosphoric acid has many beneficial prospects because of its polyphosphoric acid content and anhydrous nature. A particular advantage obtained by the concentration of wet-process phosphoric acid to a substantially anhydrous state and the formation of polyphosphoric acids therein by molecular dehydration is that the anhydrous product acid can be neutralized to form clear ammonium phosphate solutions. A difficulty experienced, however, is that the anhydrous product acid normally obtained by atmospheric evaporation of water from wet-process phosphoric acid and is a highly viscous liquid havng viscosities between about 1000 and about 10,000 centipoises at 77° F.

I have found that wet-process phosphoric acid can be concentrated at subatmospheric pressures to the desired anhydrous state and contain the necessary amounts of polyphosphoric acid to chelate the metal impurities contained therein and when so concentrated at subatmospheric pressures still have a low viscosity.

The wet-process phosphoric acid to which my invention is applicable is an acid of commerce manufactured by a process which, in essence, consists of treating phosphate rock (essentially calcium phosphate) with sulfuric acid in an aqueous environment whereby there is formed free phosphoric acid and calcium sulfate. The latter being insoluble is separated from the acid by filtration. While this process is simple in concept, it is fraught with many technical difficulties and complications and the resultant phosphoric acid product is a highly impure material, dark in color and containing relatively large amounts of dissolved sulfates and smaller amounts of fluorides, fluorosilicates and other salts of aluminum, magnesium, iron and other metals, as well as suspended organic matter.

This wet-process phosphoric acid is commonly produced and handled at concentrations between about 25 and 52 weight percent phosphorus, calculated at the pentoxide. During the storage and shipment of the acid, some of the impurities present frequently precipitate and settle to the bottom of the container. These precipitates are objectionable and have resulted in a common practice for the supplier or manufacturer to bill the purchaser only for the amount of acid removed from the shipping vessel, the settled precipitate being returned.

When such wet-process acid is treated with ammonia to form aqueous ammonium phosphate solutions, e.g., the fertilizer known as "8–24–0" which is an aqueous ammonium phosphate solution containing 8 percent by weight of nitrogen and 24 percent by weight of phosphorus calculated as $P_2O_5$, the impurities present in the acid are thrown out of solution as gelatinous precipitates which are substantially impossible to separate from the aqueous phase by filtration or other conventional methods for separating solids and liquids. Such precipitated impurities in no way interfere with the fertilizing value of the ammonium phosphate—in fact, they are considered to have plant nutrient properties of their own—but they settle in the bottom of the storage vessels and clog pipelines and equipment used for applying the product to the soil. These impurities impart a thixotropic nature to the aqueous ammonium phosphate solution and frequently cause it to set up as a firm gel, preventing its handling in liquid form.

Aqueous ammonium phosphate solutions can be prepared from wet-process phosphoric acid when the latter is concentrated sufficiently to expel substantially all its free water content thereby forming in situ a sufficient quantity of acyclic polyphosphoric acids to chelate the metallic impurities. Specifically, iron and aluminum impurities form the gelatinous precipitates which render aqueous ammonium salts obtained from the acid thixotropic and gelatinous. These impurities can be retained in the solution and the latter kept free of any thixotropic precipitates by the presence of a sufficient quantity of acyclic polyphosphoric acids. Other metal ions incident as impurities in the wet-process phosphoric acid such as copper, chromium, magnesium, zinc, etc., form granular precipitates in the ammonium salt solutions and these impurities can also be retained in solution by concentrating the acid sufficiently to form enough acyclic polyphosphoric acids to chelate these impurities also.

The concentration of the acid can be effected by heating of the acid to a temperature above about 100° C. at superatmospheric, atmospheric or reduced pressures so as to expel substantially all the free water present in the acid. During the concentration, some but not all the fluorine present in the feed acid is also volatized and removed. The resultant product is a substantially anhydrous liquid phosphoric acid which contains a sufficient amount of polyphosphoric acids to prevent the formation of precipitates of the incidental impurities.

I have found that desirably the majority of the acid concentration can be obtained by heating the acid in a first stage to between about 120° and about 180° C. under atmospheric pressure and that the acid can be withdrawn from this first stage and, without further heating, flashed in a vacuum evaporator to complete the substantial removal of its free water content.

Considering the invention in more detail, the acid which is subjected to concentration is the previously described wet-process phosphoric acid containing various normally incidental metallic impurities such as iron, aluminum, magnesium, chromium, vanadium, zinc, copper, etc. in the form of sulfates, fluorides, phosphates, etc. These metallic impurities normally precipitate as insoluble orthophosphate salts when the acid is neutralized with a suitable base, e.g., ammonia or an alkali metal hydroxide.

A complete description of such acid and the process by which it is made is set forth in "Phosphoric Acid, Phosphates and Phosphate Fertilizers," by W. H. Waggaman, 2nd edition, pages 174–208 (Rheinhold Publishing Corp., 1952). Typical analysis of commercial phosphoric acids including those obtained by the wet-process method can also be found in "A Comprehensive Treatise On Inorganic and Theoretical Chemistry," vol. 8 by J. W. Mellor, page 951 (Longmans Green & Company, 1928). These wet-process phosphoric acids are available commercially in both dilute and "concentrated" forms, containing about 25–35 and about 35–55 weight percent of $P_2O_5$, respectively, and either concentration may be employed. However, in most instances, it is more economical to start with the acid in the aforementioned "concentrated" form. A typical analysis of the latter acids are presented in the following table.

lution the acid is sufficiently concentrated and further heating and concentration is stopped. The specific gravity of the withdrawn acid product in general ranges between about 1.9 and about 2.1, depending on the nature and source of the acid feed. The following examples will serve to illustrate the invention and demonstrate the results obtainable therewith:

Example 1

A 5-liter 3-necked flask was surrounded with a heating mantle and a thermometer inserted in the center neck. A condenser was attached to a remaining neck of the flask and positioned to discharge the effluent from the flask into a measuring pipette and a collector. The incondensable portions were passed through a Dry Ice trap and finally to a vacuum pump. A manometer was employed in the incondensable line to measure the pressure.

TABLE 1.—TYPICAL WET PROCESS PHOSPHORIC ACID

| Analyses | A | B | C | D | E | F | G | H | I | J | K | L | M |
|---|---|---|---|---|---|---|---|---|---|---|---|---|---|
| Specific gravity (60° F.) | 1.706 | 1.676 | 1.746 | 1.762 | 1.700 | 1.672 | | 1.326 | 1.358 | 1.58 | 1.72 | 1.28 | 1.27 |
| Phosphorus pentoxide | 52.6 | 54.5 | 55.02 | 54.5 | 50.6 | 52.61 | 54.4 | 27.2 | 29.0 | 47.1 | 54.3 | 25.9 | 25.9 |
| Phosphoric acid $H_3PO_4$ | *72.4 | 76.08 | 75.93 | *75.2 | *69.9 | *72.6 | *75.0 | 39.4 | *40.0 | 60.0 | 70.0 | *35.8 | *35.8 |
| Water $H_2O$ | *16.87 | 18.00 | 13.36 | *16.1 | *24.3 | *19.6 | *17.8 | *56.8 | *52.5 | 25.0 | 19.0 | *59.0 | *59.2 |
| Fluorine F | 0.92 | 0.25 | 1.41 | 1.8 | 0.93 | 0.26 | 1.13 | 0.75 | 2.3 | 0.3 | 0.1 | 0.45 | 1.06 |
| Iron oxide $Fe_2O_3$ | 0.97 | 1.40 | 1.64 | 4.9 | 0.79 | 2.40 | 1.88 | 0.79 | 3.1 | 1.6 | 1.8 | 0.48 | 0.65 |
| Alumina $Al_2O_3$ | 1.92 | 0.60 | 2.60 | | 1.38 | 0.42 | 1.85 | 0.98 | | 0.6 | 1.0 | 0.95 | 1.13 |
| Solids | | | 0.25 | 2.07 | | 0.12 | | | | | 1.0 | 1.0 | 0.10 |
| Silica $SiO_2$ | 0.18 | 0.16 | | | 0.16 | 0.45 | | | | | | 0.08 | 0.13 |
| Sulfur trioxide $SO_3$ | 2.59 | 2.03 | 3.71 | 2.04 | 0.88 | 5.25 | 1.91 | 0.95 | 1.7 | 1.6 | 1.6 | 1.28 | 1.00 |
| Magnesium MgO | 0.79 | 0.48 | | | 0.43 | | 0.09 | | | 0.4 | 0.4 | 0.39 | 0.35 |
| Calcium oxide CaO | 0.03 | 0.03 | | | 0.23 | | 0.30 | 0.11 | | 0.1 | 0.1 | 0.02 | 0.18 |
| Vanadium pentoxide $V_2O_5$ | 0.61 | | | | 0.15 | | 0.03 | | | 0.01 | 0.01 | 0.30 | 0.13 |
| Zinc oxide ZnO | 0.60 | | | | 0.14 | | | | | 0.0009 | 0.0009 | 0.30 | 0.11 |
| Titanium dioxide $TiO_2$ | 0.60 | | | | 0.14 | | | | | | | 0.30 | |
| Chromium sesquioxide $Cr_2O_3$ | 0.09 | | | | 0.18 | | 0.02 | | | | | 0.45 | 0.15 |
| Manganese sesquioxide $Mn_2O_3$ | 0.10 | | | | 0.03 | | 0.02 | 0.15 | | 0.1 | 0.1 | 0.05 | 0.02 |
| Sodium trisilicate $Na_2O$ | 0.03 | | | | 0.26 | 0.07 | | 0.05 | | 1.9 | 2.0 | 0.02 | 0.22 |
| Boron $B_2O_3$ | | | | | | 0.51 | | | | 0.004 | 0.004 | | 0.02 |

*Calculated values.

The process of my invention thus comprises heating wet-process phosphoric acids of the aforementioned type and subjecting it to subatmospheric pressure to expel a sufficient amount of the free water content of said acid (at least about 95 percent thereof) to obtain an anhydrous product which, when neutralized with ammonia, to a pH greater than about 6.0, will form clear aqueous solutions. In general, the acids improved by my process have a concentration expressed as weight percent $P_2O_5$ between about 67 and about 72 weight percent and therefore are substantially free of all free water content. On an impurity-free basis, the concentration of the acid products are between about 72 and about 79 weight percent $P_2O_5$. The viscosities of such acids are quite low in contrast to similar acids prepared by evaporation of their water content at atmospheric pressures. In general, the viscosities of acid products obtained by vacuum evaporation in accordance with my invention range from about 500 to about 2500 centipoises at 77° F. In contrast, acids concentrated at atmospheric pressure have viscosities between about 2500 and about 10,000 centipoises at 77° F. through this concentration range.

The conditions chosen for the subatmospheric second stage of concentration of the acid can be widely varied in accordance with our invention. In general, however, it is preferred to subject the acid to a temperature between about 120° and about 180° C. at subatmospheric pressures. Specifically, pressures between about 45 and about 50 millimeters of mercury absolute are most preferred with a temperature between about 120° and about 163° C. The sufficiency of concentration can readily be determined by intermittently withdrawing a portion of the acid undergoing concentration and neutralizing all or a portion of the withdrawn acid with ammonia and adding sufficient water to make an aqueous material having a pH greater than about 6. When such aqueous neutralized product is essentially a clear solution free of gelatinous precipitates and the metal impurities incident in the acid, i.e., iron, aluminum, magnesium, etc., are retained in solution the acid is sufficiently concentrated.

A commercial wet process phosphoric acid having about 54.4 weight percent phosphorus expressed as $P_2O_5$, 5.6 weight percent impurities and a viscosity of 29.7 centistokes at 77° F. and a specific gravity of 1.76 at 73° F. was concentrated in the aforedescribed apparatus at a pressure between about 45 and 50 millimeters mercury at temperatures of 121°, 143° and 175° C. in three successive experiments. The acid was slowly added to the 5-liter flask while maintaining the temperature constant by the heating mantle. Each experiment was continued for a period of 2 hours during which approximately 1000 grams of acid were added.

After heating, the acid product was tested to determine if it had been freed of iron and aluminum precipitation by weighing a 40 gram portion into a flask fitted with a stirrer, dropping funnel and ice bath to which a mixture of 45 milliliters of ammonium hydroxide and 36 milliliters water are slowly added while maintaining the temperature below about 40° C. The pH of the resultant product was about 6.3 and in each experiment, the ammonium phosphate solution was clear and free of precipitates from the metal impurities notably iron and aluminum present in the feed acid.

The following table summarizes the conditions and results of the aforedescribed experiments:

TABLE 2.—ACID PRODUCT

| Ex. | Temperature, °C. | Concentration, Percent | Specific Gravity | Viscosity, cp. | "8–24–0" | $P_2O_5$ Loss,[1] Percent |
|---|---|---|---|---|---|---|
| 1 | 121 | 68.3 | 1.924 | 556 | Clear solution. | 0.37 |
| 2 | 143 | 68.7 | 1.946 | 855 | do | 0.44 |
| 3 | 175 | 72.0 | 2.015 | 2,290 | do | 0.41 |

[1] Amount of $P_2O_5$ collected in the Dry Ice trap as a percent of total $P_2O_5$ charged.

The preceding data demonstrate that wet process phosphoric acid containing metallic impurities can be concentrated at subatmospheric pressures sufficiently to provide an acid product which can be neutralized to prepare a clear aqueous ammonium phosphate solution. When the wet process phosphoric acid is neutralized directly, without heating under the aforecited conditions, the resultant product is a thick gelatinous liquid containing large amounts of precipitates.

When the aforementioned wet process phosphoric acid is concentrated at a sufficient temperature under atmospheric pressure to achieve the aforecited concentrations, the viscosity of the acid is about 3000 centipoises at a 69% $P_2O_5$ concentration. In contrast, the concentration of the acid under subatmospheric pressures to approximately an equivalent concentration (Example 2), provided a product with a viscosity of only 855 centipoises.

Examples 4 and 5

The equipment described in Examples 1–3 was modified to provide for the continuous vacuum concentration of a wet process phosphoric acid by placing a draw-off line in the distillation flask which led to a smaller acid collection flask outside of the heating vessel. The vacuum source was also connected to the smaller collecting flask. The distillation flask was immersed within a wax bath which was maintained at the desired evaporation temperature by an electrical resistance heater. The condenser train and vacuum system as described in the previous examples was employed in the continuous experiments. A portion of the acid feed was charged to the evaporation vessel and heated therein to a temperature of 121° C. while applying a vacuum of between about 45 and about 50 milliliters mercury to the vessel. The run was conducted over a 3 hour 20 minute period during which about 2000 grams of acid were charged to the vessel and about 1500 grams product acid were removed through the draw-off line. Upon completion of the run, the acid product was collected and a portion thereof neutralized with ammonia as described in the previous examples to a pH about 6.3. The ammonium phosphate from this experiment was gelatinous and contained precipitates.

The run was repeated at a temperature of 177° C. over a 2 hour 15 minute period during which 827 grams of wet acid were charged and 634 grams of product acid were withdrawn from the flask. Upon neutralization to a pH of about 6.3, a portion of the acid from the second continuous run made a clear aqueous ammonium phosphate solution free of precipitates.

The conditions and results of these experiments are summarized in the following Table 3:

TABLE 3.—ACID PRODUCT

| Example | Temperature, °C. | Concentration, percent | Specific Gravity | Viscosity, cp. | "8-24-0" |
|---|---|---|---|---|---|
| 4 | 121 | 66.1 | 1.904 | 400 | Gelled. |
| 5 | 177 | 69.5 | 1.983 | 1,590 | Clear solution. |

The preceding data demonstrate that the wet process phosphoric acid should be concentrated to a level greater than about 66 weight percent $P_2O_5$ to obtain a clear ammonium phosphate solution upon neutralization of the acid. In general, the data demonstrate that the acid should be concentrated to between about 67 and about 72 weight percent $P_2O_5$ to obtain a low viscosity acid product which can be neutralized to form clear ammonium phosphate solutions. The data further demonstrate that the product obtained by evaporation of the free water content of wet process phosphoric acid at subatmospheric pressures is a low viscosity material in contrast to the highly viscous nature of anhydrous acids prepared at atmospheric pressures.

The preceding examples are intended solely to illustrate the results obtainable when practicing my invention. These examples are not to be construed as unduly limiting of the invention which comprises the evaporation of wet process phosphoric acid at subatmospheric pressures to concentrate the acid to between about 67 and about 72 weight percent $P_2O_5$ concentration such that upon neutralization, no gelatinous precipitates are formed in the product.

While the invention has thus been described in regard to evaporation of water entirely under vacuum conditions, it is also applicable to a two-stage process wherein the wet process phosphoric acid is concentrated from the conventional levels of 25 to 55 weight percent $P_2O_5$ to about 62 to about 67 weight percent $P_2O_5$ at atmospheric pressures and thereafter passed directly into a vacuum evaporation stage where its remaining free water content is evaporated at subatmospheric pressures, preferably at between about 40 and about 50 milliliters mercury absolute pressure. In this two-stage evaporation method, the temperature of the first stage is maintained between about 120° and about 180° C. by suitable heating means, e.g., contacting the acid with hot combustion products as in a submerged combustion process or by indirect heat exchange of the acid through suitable heat exchange means. The acid at the aforecited temperature is then withdrawn and passed into the vacuum evaporator stage where the remainder of its free water content is flashed from the acid. In this method, no further heating of the acid is required in the second stage vacuum evaporator. The remainder of the free water content of the wet process phosphoric acid is flashed from the acid in the last vacuum stage. In general, about a 5 weight percent $P_2O_5$ incremental concentration is achieved in the vacuum stage so that the acid product withdrawn from the vacuum stage has the desired 67 to about 72 weight percent $P_2O_5$ content and will provide clear aqueous solutions when neutralized with ammonia.

The preceding examples are intended solely to illustrate the results obtainable by my invention which comprises the vacuum concentration of wet process phosphoric acid to remove substantially all its free water content and thereby obtain an anhydrous wet process phosphoric acid which can be neutralized to clear ammonium phosphate solutions free of iron and aluminum precipitation. My method is intended to be defined by the steps and their equivalents set forth in the following claims.

I claim:
1. The method of freeing wet-process phosphoric acid from gelatinous precipitation upon neutralization with ammonia which comprises contacting said acid with hot combustion gases to heat said acid to a temperature between about 120° and about 180° C. at atmospheric pressure so as to evaporate volatile impurities and water therefrom and thereby concentrate said acid to between about 62 and 67 weight percent $P_2O_5$ and thereafter removing said acid from said heating step and subjecting said acid to a subatmospheric pressure in the absence of any further heating to effect molecular dehydration of said acid and remove additional water vapor by concentrating said acid an additional increment of about 5 percent $P_2O_5$ and recovering from said subatmospheric evaporation an anhydrous wet-process phosphoric acid having a concentration between about 67 and about 72 weight percent $P_2O_5$.

2. The method of claim 1 wherein said subatmospheric pressure is about 45 to about 50 millimeters of mercury absolute.

3. The method of claim 1 wherein said acid which is subjected to said heating has an initial $P_2O_5$ content of from 25 to 55 weight percent.

4. The method of claim 1 wherein said acid contains from 1 to 10 weight percent metallic impurities comprising iron and aluminum and the degree of concentration is sufficient to impart to the resultant acid the property of forming clear aqueous solutions of ammonium phosphate upon neutralization to a pH of 5.5 to 10.0 by reaction with ammonia.

References Cited

UNITED STATES PATENTS

| | | | |
|---|---|---|---|
| 2,044,095 | 6/1936 | Moore | 159—2 |
| 3,073,677 | 1/1963 | Malley | 23—165 |
| 3,192,013 | 6/1965 | Young | 23—165 |
| 3,317,306 | 5/1967 | Getsinger et al. | 23—165 |

OSCAR R. VERTIZ, Primary Examiner

ARTHUR GREIF, Assistant Examiner

U.S. Cl. X.R.

159—2, 47